United States Patent Office 2,806,055
Patented Sept. 10, 1957

2,806,055

PURIFICATION OF ALKARYL SULFONATES

George C. Feighner, Ponca City, Okla., assignor to Continental Oil Company, Ponca City, Okla., a corporation of Delaware No Drawing. Application March 14, 1955,
Serial No. 494,241

5 Claims. (Cl. 260—505)

The present invention relates to the production of alkylated aryl sulfonates and relates more particularly to the production of alkylated aryl sulfonates which are substantially free of color bodies.

Sulfonation of alkaryl hydrocarbons has generally followed the procedure wherein about 1.3 to 2 parts by weight of 100 to 105 percent sulfuric acid is used per part by weight of the alkaryl hydrocarbon. Other sulfonating agents have been used but whatever agent was used the resulting mixture upon completion of the sulfonation reaction produces a dark colored sulfonate upon neutralization with a base such as sodium hydroxide. Since dark colored sulfonates can only be used in a relatively few applications, various methods have been suggested for removing the color bodies. Such methods as used heretofore have involved treating aqueous solutions of metal sulfonates with hydrogen peroxide or other bleaching agent such as alkali peroxide and an acid such as sulfuric or hydrochloric. Other treating agents have included solutions of a metal per salt such as an alkali metal percarbonate, alkali metal perborate, or an alkali metal persulfate. In addition aqueous sulfonates have been blown with oxygen or oxidizing gas in order to improve the color of the product. None of these methods have been entirely satisfactory, generally because they have involved an undesirable expenditure of materials and time and furthermore the product so obtained has not been improved greatly in color.

It is, therefore, a principal object of this invention to provide an improved process which process obviates the disadvantages of the prior art methods. It is another object of my invention to provide a method of improving the color of alkaryl sulfonic acids whereby substantially colorless alkaryl sulfonates may be obtained. Further objects and advantages of the invention will become apparent from the following description.

The foregoing objects are attained by the process which involves in brief the following steps. An alkaryl hydrocarbon is reacted with a sulfonating agent such as sulfuric acid or oleum. Following sulfonation the spent sulfonating agent is removed from the mixture comprising the sulfonic acid and spent sulfonating agent. The resulting crude alkaryl sulfonic acid is then treated with hydrogen peroxide to bleach the same. Finally the bleached sulfonic acid is neutralized with a base such as sodium hydroxide to produce sodium alkaryl sulfonate which is substantially free of color bodies.

Suitable alkaryl hydrocarbons that may be used in the process of the invention are those obtained by the reaction of an excess of benzene, toluene, xylene, or similar hydrocarbon with an alkylating agent in the presence of a Friedel-Crafts type catalyst. The alkylating agent may be a 9 to 18 carbon straight or branched chain olefin, alcohol, or halide. Preferred alkylating agents are the 9 to 18 carbon polymers of propylene such as tripropylene, tetrapropylene, pentapropylene, hexapropylene, or mixtures thereof. Other alkylating agents that may be used include nonyl, decyl, dodecyl, octadecyl alcohols and chlorides.

A suitable alkaryl hydrocarbon which is also available commercially in large quantities is a blend of monoalkylbenzenes sometimes called dodecylbenzene. Physical properties of dodecylbenzene are as follows:

| | |
|---|---|
| Specific gravity at 16° C | 0.8742 |
| Average molecular weight | 232 |
| A. S. T. M., .D–158 Engler: | |
| I. B. P. | ° F__ 535 |
| 5 | ° F__ 545 |
| 10 | ° F__ 550 |
| 50 | ° F__ 560 |
| 90 | ° F__ 580 |
| 97 | ° F__ 592 |
| F. B. P. | ° F__ 603 |
| Refractive index at 20° C | centipoises__ 1.4885 |
| Viscosity at 20° C | centipoises__ 14 |
| Bromine number | centipoises__ 0.16 |

The sulfonating of the alkaryl hydrocarbons may be carried out by methods well known to those skilled in the art using sulfuric acid or oleum as the sulfonating agent. Other suitable sulfonating agents which may be used include chlorosulfonic acid, sulfur trioxide etc. If desired the alkaryl hydrocarbon may be diluted with a solvent such as a mineral oil, halogenated hydrocarbon, or sulfur dioxide prior to sulfonation.

After the alkaryl hydrocarbon has been sulfonated the spent sulfonating agent is removed from the resulting mixture. If desired the mixture may be quenched with water, alcohol, a mixture of alcohol and water, or a mineral oil prior to removing the spent sulfonating agent. After removing the spent sulfonating agent the alkaryl sulfonic acid the concentration of which may vary from 70 to 95% or higher, is treated with a hydrogen peroxide bleaching agent. Suitable quantities of the bleaching agent range from about .3 to 3 weight percent of 100 percent hydrogen peroxide based on the weight of the sulfonic acid. Although hydrogen peroxide solutions ranging from about 3 to 100 percent may be used, I prefer to use a solution having a concentration of about 30%. As to the temperature during the bleaching process, that may range from about 20 to 75° C., however, I prefer to employ a temperature within the range of about 20 to 25° C.

In order to disclose the nature of the present invention still more clearly, the following illustrative examples will be given. It is to be understood that the invention is not to be limited to the specific conditions or details set forth in these examples except insofar as such limitations are specified in the appended claims. All Klett color determinations were made using a number 42 blue filter. Parts given are parts by weight.

EXAMPLE 1

To 250 parts of dodecyl benzene contained in a sulfonation reactor was slowly added 312 parts of 20% oleum over a period of about 16 minutes. The mixture was stirred for about 1 hour. While the temperature was maintained within a range of about 20 to 30° C., 137 parts of ice was then added to the mixture which caused the temperature to rise to 70° C. The mixture was allowed to settle for a period of 45 minutes. Two liquid layers were formed and the lower layer containing the spent acid which consists of about 295 parts of 63 to 65% sulfuric acid was withdrawn and discarded. The upper layer which consists of about 400 parts of crude sulfonic acid analyzed 83.2 percent active sulfonic acid and 9.3% sulfuric acid.

The crude sulfonic acid was divided into four equal portions and then each portion was bleached by dissolving therein the quantity of hydrogen peroxide and treatment for the period as noted in Table I at a temperature of 25 to 27° C. At the end of the bleaching period all samples were neutralized with a 20% aqueous sodium hydroxide solution and the Klett color of the resulting sulfonates determined. For comparison purposes 100 parts of crude sulfonic acid was neutralized and its Klett color also determined as a control. The results are summarized in Table I below.

*Table I*

BLEACHING OF DODECYLBENZENE SULFONIC ACID
(OLEUM SULFONATION)

| Portion No. | Parts of 30% $H_2O_2$ Per 100 Parts of Sulfonic Acid | Bleaching Time, Hrs | Klett Color of Sulfonate Solution |
|---|---|---|---|
| Control | | | 65 |
| 1 | 1.25 | 48 | 27 |
| 2 | 2.00 | 16 | 0 |
| 3 | 5.00 | 16 | 0 |
| 4 | 7.50 | 16 | 0 |

Comparable results were obtained when the crude sulfonic acid was treated with .375, .60, 1.50 and 2.25 parts of 100% hydrogen peroxide to 100 parts of the crude sulfonic acid.

EXAMPLE 2

To 400 parts of dodecylbenzene contained in a sulfonation reactor equipped with a gas inlet for bubbling the gas through the charge, 148 parts of sulfur trioxide vapor diluted with 3000 parts of air was passed into the reactor over a period of 50 minutes. During the sulfonation step the temperature was allowed to rise to 55° C. and maintained at that point. After the addition of the sulfur trioxide the temperature was maintained at 55° C. and air passed into the reactor at the rate of about 3.3 parts per minute for a period of 10 minutes. 545 parts of crude sulfonic acid analyzing 94.5 percent sulfonic acid and 1.9 percent sulfuric acid was obtained.

In Table II are given the results obtained by bleaching dodecylbenzene sulfonic acid and the corresponding sodium dodecylbenzene sulfonates wherein oleum experiments 1 and 2 and sulfur trioxide experiments 3 and 4 were used as the sulfonating agents by means of hydrogen peroxide.

*Table II*

COMPARISON OF BLEACHING OF SULFONIC ACID AND SULFONATE (OLEUM SULFONATION)

| Exp. No. | Material Bleached | Parts of 30% $H_2O_2$ Per 100 Parts of Material | Bleaching Time, Hrs. | Klett Color of Sulfonate Solution |
|---|---|---|---|---|
| 1 | Sulfonic Acid | 1.50 | 16 | 0 |
| 2 | Sulfonate | 1.50 | 16 | 32 |

(SULFUR TRIOXIDE SULFONATION)

| 3 | Sulfonic Acid | 1.50 | ⅓ | 59 |
| 4 | Sulfonate | 1.50 | ⅔ | 105 |

What is considered new and inventive is defined in the hereunto appended claims, it being, of course, understood that equivalents known to those skilled in the art are to be construed as within the scope and purview of the claims.

Accordingly applicant claims:

1. A method of producing an alkaryl sulfonate substantially free of color bodies which comprises reacting an alkaryl hydrocarbon with a sulfonating agent selected from the class consisting of sulfuric acid, oleum, chlorosulfonic acid, and sulfur trioxide under sulfonating conditions, separating the spent sulfonating agent from the resulting alkaryl sulfonic acid, bleaching said sulfonic acid by treatment with .3 to 3 weight per cent of hydrogen peroxide based upon the weight of said sulfonic acid, neutralizing said sulfonic acid, and then recovering the alkaryl sulfonate.

2. The method of claim 1 wherein the concentration of hydrogen peroxide is about 30 percent.

3. The method of claim 1 wherein the bleaching operation is carried out at a temperature within the range of 20 to 75° C.

4. The method of claim 1 wherein the bleaching operation is carried out within the range of 20 to 25° C.

5. The method of claim 1 wherein the alkaryl hydrocarbon is dodecylbenzene.

References Cited in the file of this patent

UNITED STATES PATENTS

| 1,842,884 | Taylor | Jan. 26, 1932 |
| 2,333,830 | Toone | Nov. 9, 1943 |